(12) United States Patent
Henigman et al.

(10) Patent No.: US 12,263,999 B2
(45) Date of Patent: Apr. 1, 2025

(54) ENVIROTRAY INSERT FOR PROTECTING AN OBJECT WITHIN AN OUTER CONTAINER

(71) Applicant: GENERAL FIBRE PRODUCTS CORP., New Hyde Park, NY (US)

(72) Inventors: Dusan Henigman, New Hyde Park, NY (US); Stuart Shrode, New Hyde Park, NY (US)

(73) Assignee: GENERAL FIBRE PRODUCTS CORP., New Hyde Park, NY (US)

( * ) Notice: Subject to any disclaimer, the term of this patent is extended or adjusted under 35 U.S.C. 154(b) by 6 days.

(21) Appl. No.: 18/521,153

(22) Filed: Nov. 28, 2023

(65) Prior Publication Data

US 2024/0166404 A1 May 23, 2024

Related U.S. Application Data

(63) Continuation-in-part of application No. 18/119,482, filed on Mar. 9, 2023, which is a continuation of
(Continued)

(51) Int. Cl.
*B65D 5/50* (2006.01)
*B65D 65/40* (2006.01)

(52) U.S. Cl.
CPC ......... *B65D 5/5038* (2013.01); *B65D 65/403* (2013.01)

(58) Field of Classification Search
CPC ............................ B65D 5/5038; B65D 65/403
(Continued)

(56) References Cited

U.S. PATENT DOCUMENTS 2,330,345 A 9/1943 Elliott
3,095,086 A 6/1963 Berg
(Continued)

FOREIGN PATENT DOCUMENTS

EP 2241516 A1 10/2010
EP 3 772 469 A1 2/2021
(Continued)

OTHER PUBLICATIONS

US Office Action dated Oct. 29, 2024 received in U.S. Appl. No. 18/119,482.
(Continued)

*Primary Examiner* — Jacob K Ackun
(74) *Attorney, Agent, or Firm* — Scully, Scott, Murphy & Presser, P.C.

(57) ABSTRACT

A packaging tray including a folded body formed of paper board having an exterior top surface having one or more apertures each configured to accommodate and retain a container therein. The folded body having at least one structural tube. Each structural tube includes a plurality of interior surfaces forming the structural tube and the structural tube includes a stability panel formed in a folding surface. The folding surface being one of the plurality of interior surfaces forming the structural tube. The stability panel including a plurality of sides. One of the plurality of sides being a fold line and the other of the plurality of sides being cut through the folding surface such that the stability panel is configured to be folded into an interior of the structural tube into a predetermined position to prevent the structural tube from changing a predetermined cross-sectional shape.

22 Claims, 21 Drawing Sheets

Related U.S. Application Data application No. 17/678,431, filed on Feb. 23, 2022, now Pat. No. 11,628,968, which is a continuation-in-part of application No. 17/004,310, filed on Aug. 27, 2020, now Pat. No. 11,267,636.

(60) Provisional application No. 62/953,297, filed on Dec. 24, 2019.

(58) Field of Classification Search
USPC .................................................. 206/562, 564
See application file for complete search history.

(56) References Cited

U.S. PATENT DOCUMENTS

| | | | |
|---|---|---|---|
| 4,026,411 A | 5/1977 | Johnson | |
| 4,194,617 A | 3/1980 | Bandell | |
| 5,385,238 A | 1/1995 | Lancaster et al. | |
| 5,884,767 A | 3/1999 | Peng | |
| 5,979,646 A | 11/1999 | Strachan | |
| 6,301,860 B1 | 10/2001 | Gunderman et al. | |
| 6,401,927 B1 | 6/2002 | Sorensen et al. | |
| 6,474,473 B2 | 11/2002 | Wong | |
| 7,533,774 B2 | 5/2009 | Zimmerman | |
| 7,549,537 B2 | 6/2009 | Hsu | |
| 7,621,402 B2 | 11/2009 | Sandow | |
| 8,272,509 B1 | 9/2012 | Mccutchen | |
| 8,307,984 B1 | 11/2012 | Collier | |
| 11,267,636 B2 * | 3/2022 | Henigman | B65D 65/466 |
| 11,628,968 B2 * | 4/2023 | Henigman | A45D 40/00 206/564 |
| 2002/0148744 A1 | 10/2002 | Hsu | |
| 2005/0279668 A1 | 12/2005 | Nash, Jr. et al. | |
| 2008/0067106 A1 | 3/2008 | Kuo | |
| 2010/0133138 A1 | 6/2010 | Fox | |
| 2011/0132779 A1 | 6/2011 | Loughman et al. | |
| 2022/0177212 A1 * | 6/2022 | Henigman | B65D 81/133 |
| 2022/0411124 A1 | 12/2022 | Henigman et al. | |
| 2023/0202708 A1 * | 6/2023 | Henigman | B65D 5/5038 206/562 |
| 2023/0219734 A1 * | 7/2023 | Henigman | B65D 5/5038 206/563 |

FOREIGN PATENT DOCUMENTS

| | | |
|---|---|---|
| EP | 3 841 915 A1 | 6/2021 |
| EP | 3 858 753 A1 | 8/2021 |
| GB | 2478575 A | 9/2011 |
| KR | 20220105504 A | 7/2022 |
| WO | 2006/015117 A1 | 2/2006 |
| WO | 2018/002791 A1 | 1/2018 |

OTHER PUBLICATIONS

Extended European Search Report dated Jun. 5, 2023 received in 24152681.3.

Extended European Search Report dated Jul. 29, 2022 received in 22161584.2.

Extended Partial European Search Report dated Aug. 19, 2022 received in 22165577.2.

US Notice of Allowance dated Feb. 23, 2023 received in U.S. Appl. No. 17/678,431.

European Office Action dated Sep. 21, 2023 received in 20 217 267.2.

* cited by examiner

ENVIROTRAY INSERT FOR PROTECTING AN OBJECT WITHIN AN OUTER CONTAINER

CROSS-REFERENCE TO RELATED APPLICATIONS

The present application is a Continuation-in-part application of U.S. patent application Ser. No. 18/119,482, filed on Mar. 9, 2023, which is a Continuation Application of U.S. patent application Ser. No. 17/678,431, filed on Feb. 23, 2022, which is a Continuation-In-Part application of U.S. application Ser. No. 17/004,310 filed on Aug. 20, 2020, which claims priority to U.S. provisional application No. 62/953,297 filed 24 Dec. 2019, the entirety of which is incorporated by reference. The entire contents of each of which are incorporated herein by reference.

BACKGROUND

Field

The present disclosure relates to an environmentally friendly inserts for securing items, particularly consumer goods, such as cosmetics, treatments or similar items in packaging.

Prior Art

Consumer good products, such as cosmetic or treatment products for human beautification purposes are well known and have been used by humans for thousands of years. In modern times, cosmetic and treatment products are bought by customers of cosmetic-product manufacturers, which are provided to customers in various types of packaging. While the packaging provides useful protective and decorative functions, packing in general is becoming problematic when it is non-recyclable, non-biodegradable and adds to our global environmental problems. For example, discarded cosmetic-product packaging adds to waste and pollution within the environment.

There is increasingly a growing concern about adapting human society to a more sustainable utilization of resources, such as more sustainable use of energy and materials, with an emphasis on reducing waste, and in particular, plastics-material waste. Notably, disposal of waste, such as plastics-material waste by way of dumping in ground or water bodies results in addition of plastics-material nanoparticles in soil and water bodies like rivers and oceans. Such addition of the plastics-material nanoparticles reduces fertility of soil and makes water unfit for drinking and other purposes. Recycling and re-use are important issues for sustainable utilization of resources which are used in making the cosmetic-product packaging, recycling and sustainability is more easily accomplished using paper-based products.

Therefore, there arises a need for a cosmetic-product packaging that not only provides protection for a given cosmetic product from a given manufacturer to a given customer, but aesthetically appeals and is useful to the given customer, such that the given customer retains and cherishes the cosmetic-product packaging for long term use, rather than merely discarding the cosmetic-product packaging at an earliest opportunity.

There is an ongoing need in the field of packaging for environmentally-friendly packaging and containers; particularly those configured for functioning as a tray for inserting into an outer packaging. There is a particular need for this in the cosmetic industry. Typically, such inserts and other packaging materials are made of non-biodegradable plastic, and there is a need to move to paper based packaging material.

SUMMARY

Provided therefore herein is a recyclable and biodegradable packaging insert for holding consumer goods in place within a package. In an embodiment, the recyclable packaging insert holds consumer goods which are cosmetics or treatments. In an embodiment, the recyclable and biodegradable packaging insert is made of solid paper board or corrugated paper board. In another embodiment, the insert is a horizontally layered construction designed to secure said consumer goods efficiently and ergonomically.

In an embodiment, the present invention includes a recyclable and biodegradable packaging insert for retaining a consumer good in place within outer packaging. The insert is a tray with a topside and a bottomside, the topside comprising at least one aperture for retaining a consumer good therein, and the bottomside comprising an exterior vertically extending member and an interior vertically extending member. The exterior vertically extending member and the interior vertically extending members combine to form a multilayer reinforcement structure on the bottomside of the tray.

In an embodiment, the tray is horizontally oriented with the exterior vertically extending member and the interior vertically extending member each projecting substantially perpendicularly from the bottomside of the tray. In an embodiment, the topside is a substantially planar surface and the at least one aperture is recessed in from the planar surface in a mated shape, mated to a preselected consumer good in order to secure a selected consumer good. In an embodiment, the recyclable and biodegradable packaging insert the mated shape of the at least one aperture has a depth which is a length just greater than half of a selected dimension of said selected consumer good which is placed in the at least one aperture. In yet another embodiment, the exterior vertically extending member forms a structural support along a perimeter of said packaging insert.

In another embodiment, the packaging insert is a rectangle and two exterior vertically extending members are located on opposing sides of the rectangle. In an embodiment, the interior vertically extending member forms a sidewall of said at least one aperture. In another embodiment, the exterior vertically extending member is affixed to the bottomside of the packaging insert by horizontal flanges extending from the exterior vertically extending member. The interior vertically extending member may be affixed to the horizontal flanges by second horizontal flanges extending from the interior vertically extending member and creating a layered structure on said bottom side of the packaging insert.

For a better understanding of the present invention, together with other and further objects and advantages, reference is made to the following detailed description, taken in conjunction with the accompanying examples, and the scope of the invention will be pointed out in the appended claims. The following detailed description is not intended to restrict the scope of the invention by the advantages set forth above.

DETAILED DESCRIPTION

The packaging insert provides an easy to assemble, sturdy paper-based packaging insert for use in the cosmetic industry. The packaging insert is advantageous over the prior art because it is biodegradable and considerably faster and more economical from concept to supply than plastic.

As used herein, the term paperboard broadly refers to a thick paper-based material; i.e., paper with an increased structural element. While there is no rigid differentiation between paper and paperboard, paperboard is generally thicker (usually over 0.30 mm, 0.012 in) than paper, and has certain superior attributes such as foldability and rigidity. In a non-limiting definition, paperboard is a paper with a grammage above 250 g/m.sup.2. Paperboard can be single- or multi-ply.

Paperboard can be easily cut and formed, is lightweight, and because it is strong, is used in packaging. Paperboard is sometimes referred to as cardboard, which is a generic, lay term used to refer to any heavy paper pulp-based board, however this usage is deprecated in the paper, printing and packaging industries as it does not adequately describe each product type. Paperboard can be corrugated (i.e., having a series of parallel ridges and furrows), or non-corrugated. In a preferred embodiment, the paperboard is corrugated.

As used herein, "recyclable" refers to an ability and likelihood of a material to reacquire to be re-used, and thus acquire the properties it had in its original state. It is an alternative to "conventional" waste disposal that can save material and help lower greenhouse gas emissions. Recycling can prevent the waste of potentially useful materials and reduce the consumption of fresh raw materials, thereby reducing energy usage, air pollution (from incineration), and water pollution (from landfilling). Paper based products are more easily and more likely than plastic to be recyclable, and thus beneficial in use from this perspective. As used herein, "biodegradable" refers to a plant based composition which is compostable and capable of disintegrating into natural elements in a compost environment, leaving no toxicity in soil or water.

A GFP Envirotray is designed to protect objects within an outer container (box) from impact or abrasion. Packaging is made from paper board or fiber board, which can be corrugated or solid paper board. A horizontal portion (face) of folded board is cut with apertures to match the cross sectional plane of the object (product) to be retained just above its equator to facilitate good retention. The retention is accomplished by a slight deformation of the cut aperture which returns to its normal state upon the retained object passing through it just beyond its equator.

Figure 1:
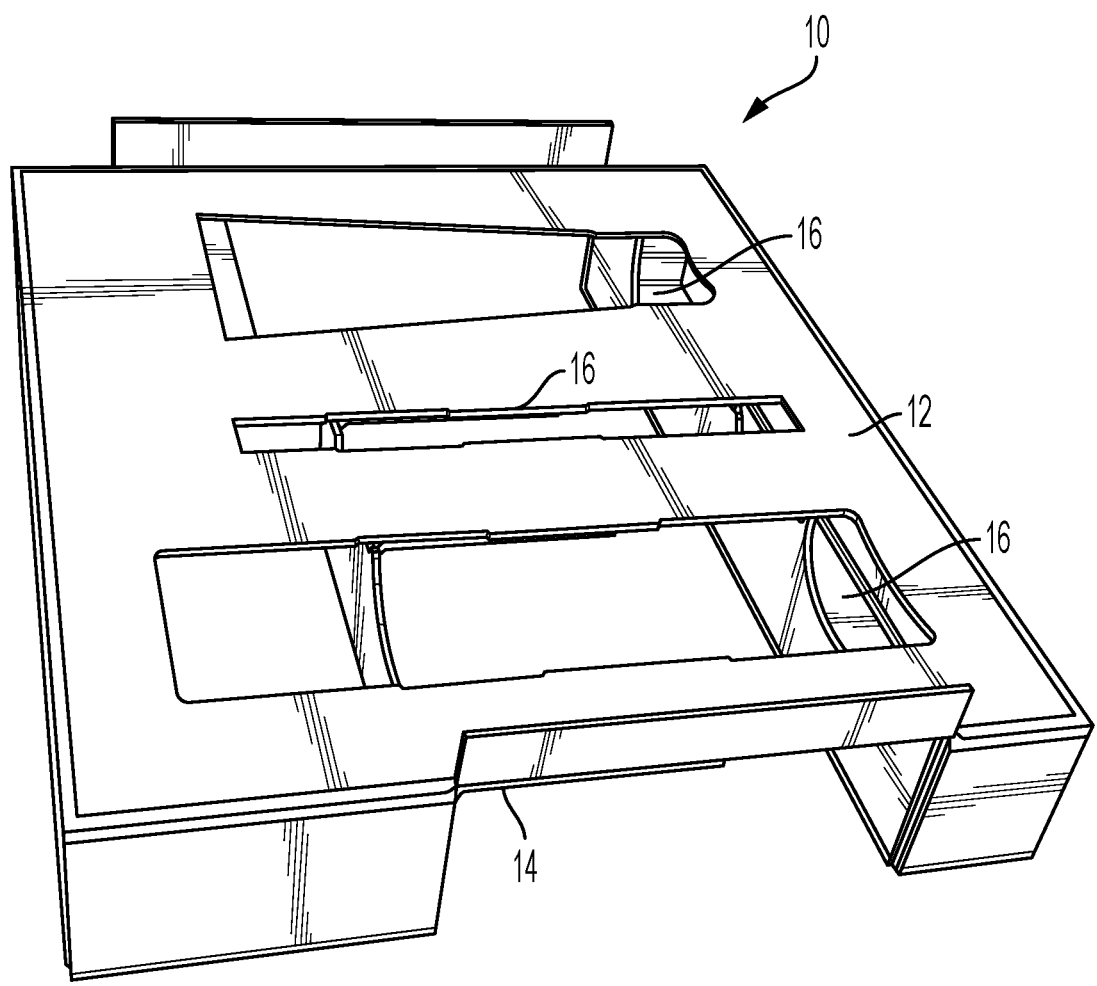
FIG. 1 illustrates an overview perspective of a first embodiment of packaging insert.

With reference now to the drawings, FIG. 1 shows a top plan view of a recyclable and biodegradable packaging insert 10. A topside 12 is shown with an opposed bottomside 14 facing the opposite direction of topside 12. Topside 12 includes apertures 16 designed to retain consumer goods (not shown in FIG. 1) therein. Tray 10 is horizontally oriented with exterior and interior vertically extending members projecting in perpendicular orientation with respect to tray 10 from bottomside 14 as more clearly seen in FIG. 3. Apertures 16 are recessed in from topside 12 in a shape mated to a preselected consumer good so that said consumer good is sized to fit snugly in aperture 16.

Figure 2:
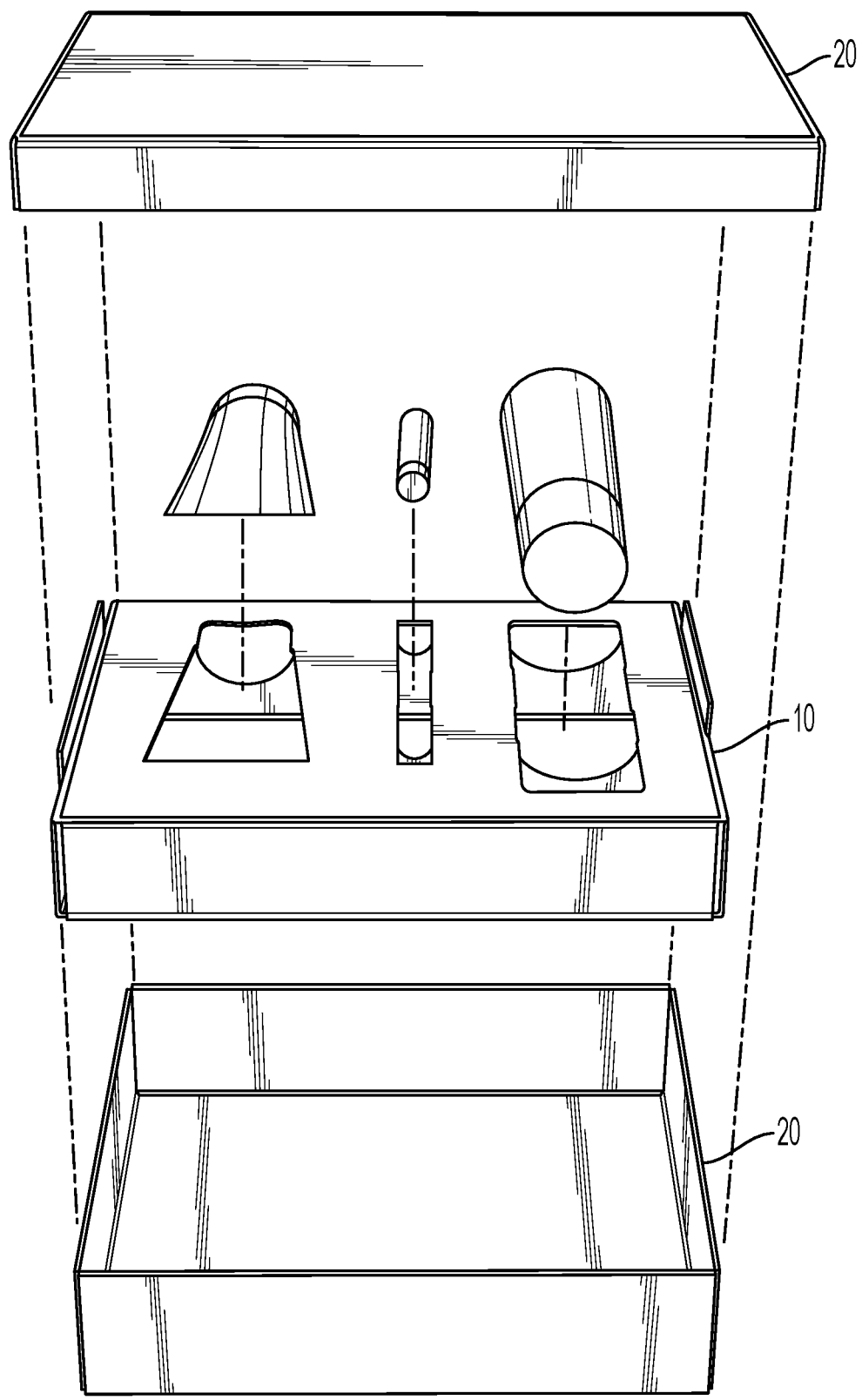
FIG. 2 illustrates an exploded overview perspective of the packaging insert of FIG. 1, including consumer goods and a container into which the insert is utilized.

With reference now to FIG. 2 of the drawings, packaging insert tray 10 is shown in exploded with view with box 20 into which it is inserted. Packaging insert 10 may be rectangular in shape as shown in FIG. 2 and fit snugly within a rectangular box 20.

Figure 3:
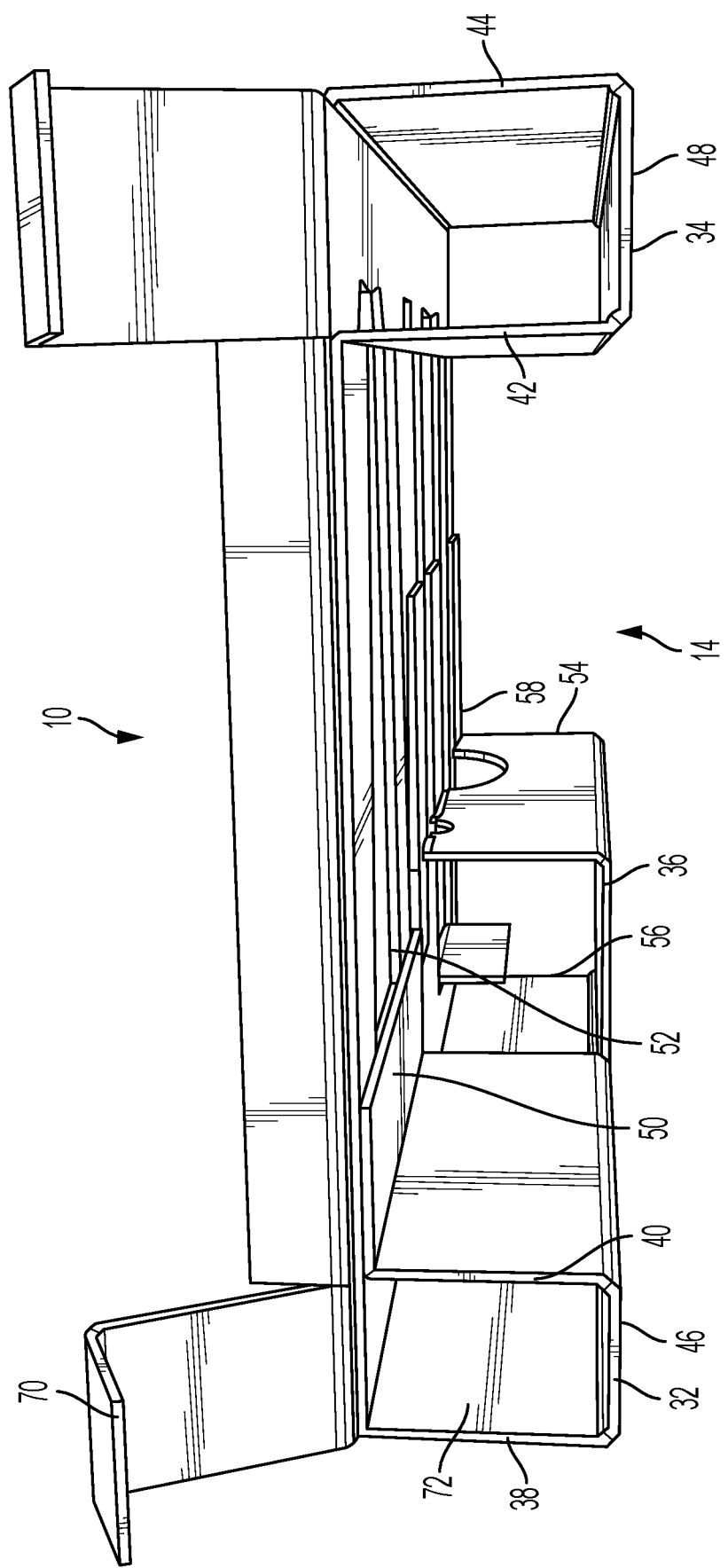
FIG. 3 illustrates a cross-sectional view of the packaging insert of FIG. 1.
Figure 4:
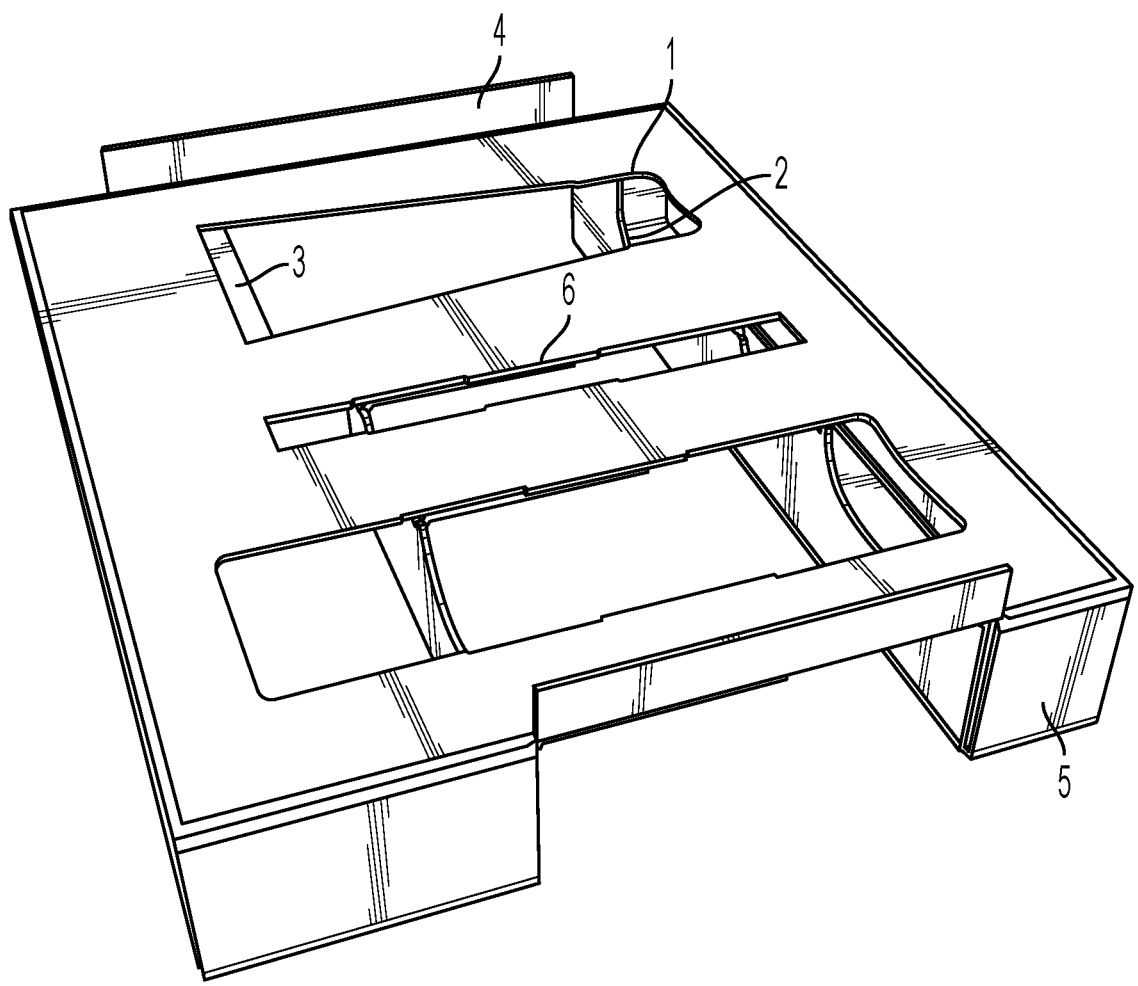
FIG. 4 illustrates another perspective view of the packaging insert of FIG. 1.

With reference now to FIG. 3 of the drawings, an exterior vertically extending members 32 and 34 are shown on either side of the rectangular shaped insert 10. An interior vertically extending member 36 is also shown protruding from bottomside 14 of packaging insert 10. Exterior vertically extending members 32 and 34 are comprised of parallel sidewalls 38 and 40 (for exterior vertically extending member 32), and 42 and 44 (for exterior vertically extending member 34), each of which are connected by bottom panels 46 and 48 perpendicularly oriented with respect to the sidewalls. An exterior vertically extending member, or sidewall 38 can also serve as a structural support along a perimeter of rectangular tray 10. It is also seen that exterior vertically extending members 32 and 34, and sidewalls 38 and 44 form opposing sides of rectangular tray 10.

Interior vertically extending member 36 also includes parallel sidewalls 54 and 56, which form sidewalls of aperture, such as an interiorly situated aperture 16 shown in FIG. 1. Horizontal flange 58 extends from parallel sidewall 54 and serves to attach it to tray bottomside 14 of tray 10.

Sidewalls 38 and 40 can be attached to bottomside 14 of packaging insert 10 by reinforcement structure, or horizontal flange 50. Similarly, sidewalls 42 and 44 are attached to bottomside 14 by reinforcement structure, or flange 52. Reinforcement structures, or flanges 50, 52, and 58 also form a multilayer reinforcement structure on bottomside 14.

Figure 5:
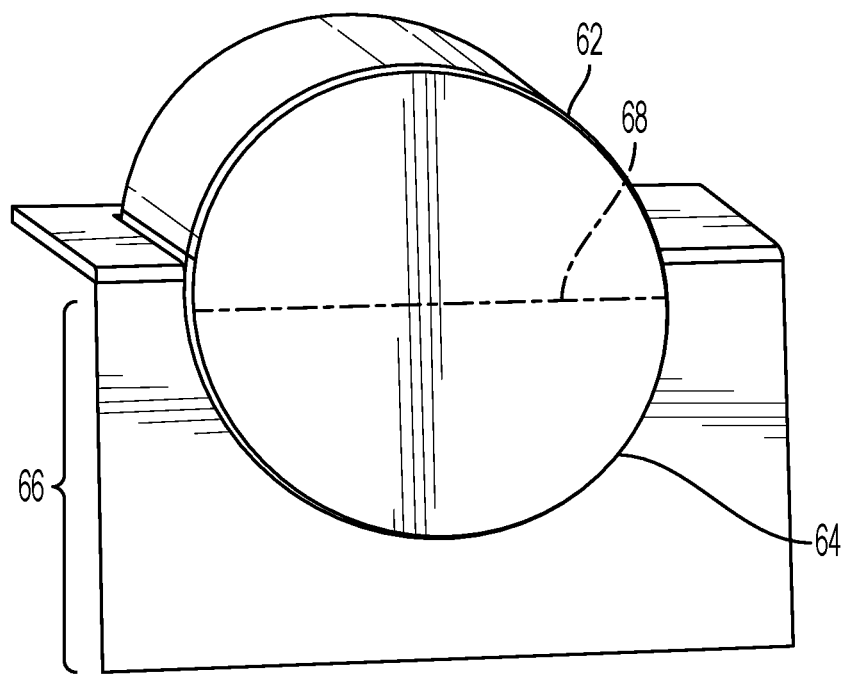
FIG. 5 illustrates a schematic drawing showing how consumer goods are placed in the packaging insert of FIG. 1.

With reference now to FIG. 5 of the drawings, it can be seen how a consumer good 62, in this case cylindrically-shaped, is snugly fit into a mated aperture 64. Aperture 64 has a depth 66 which is a length of just greater than a pre-selected dimension of consumer good 62, such consumer good 62 can be snugly fit in aperture 64. A halfway-point of a pre-selected dimension of consumer good 62, in this case a cross-sectional diameter of a cylindrical object is shown at equator 68 of consumer good 62. Taking a cross-section of consumer good 62, equator 68 is a radius of the cross-section of the cylinder. Depth 66 is therefore sized according to fit consumer good 62 so that equator 68 is firmly situated in aperture 64. As can be seen, the depth 66 of aperture 64 is just longer than the radius of consumer good 62.

With further reference to FIGS. 3 and 5, a vertical portion of the folded board (also known as packaging insert tray) 10 is cut to match the cross sectional plane perpendicular to the equator of the retained object in order to precisely control the position of the object within the aperture and maximize the contact area between holder and object to minimize possible damage to object. This vertical member is located inward from the end of the object by means of multiple consecutive folds, or horizontal flanges, in the board which eventually terminates by being glued or otherwise attached to the underside, or bottomside, of the face containing the apertures. There are a minimum of two vertical members (interior and exterior) originating from opposing sides of the face portion of the board and folding downward to start the sequence of folds. Vertical member 42 terminates at the first fold of vertical member 54, and vertical member 54 terminates by being glued or attached by other means to the underside of vertical member 42, this reinforces the face portion of tray 10 by producing a multilayer reinforcement.

Retention lock specific to crimped or heat sealed tubes (such as toothpaste or creme). Tubes are difficult to retain on the crimped or heat sealed end due to their structural weakness and variation in dimension. This lock accommodates the sealed end of the tube by providing a slot for the edge to slip into and engages the tube at its seal (crimp) in the lateral direction and beyond the seal in the longitudinal direction.

Vertical flaps 70 folded upwards from substrate to engage the top of outer container in order to prevent contact between retained objects and outer container.

Assembly locks designed to retain the shape of the packaging to facilitate inserting product into the package and inserting completed assembly into outer package. The locking is accomplished by means of flap 70 being tucked into cavity 72 and preventing the folded section from returning to its flat state.

Retention tabs designed to enhance the holding strength of the interference fit of the aperture by providing additional pressure and coverage.

EXAMPLES

The packaging tray is further exemplified, but not limited, by the following representative examples, which are intended to illustrate the embodiments and are not to be construed as being limitations thereto.

A packaging tray is made by designing, die cutting and subsequently folding and gluing as needed to obtain desired characteristics.

Figure 6:
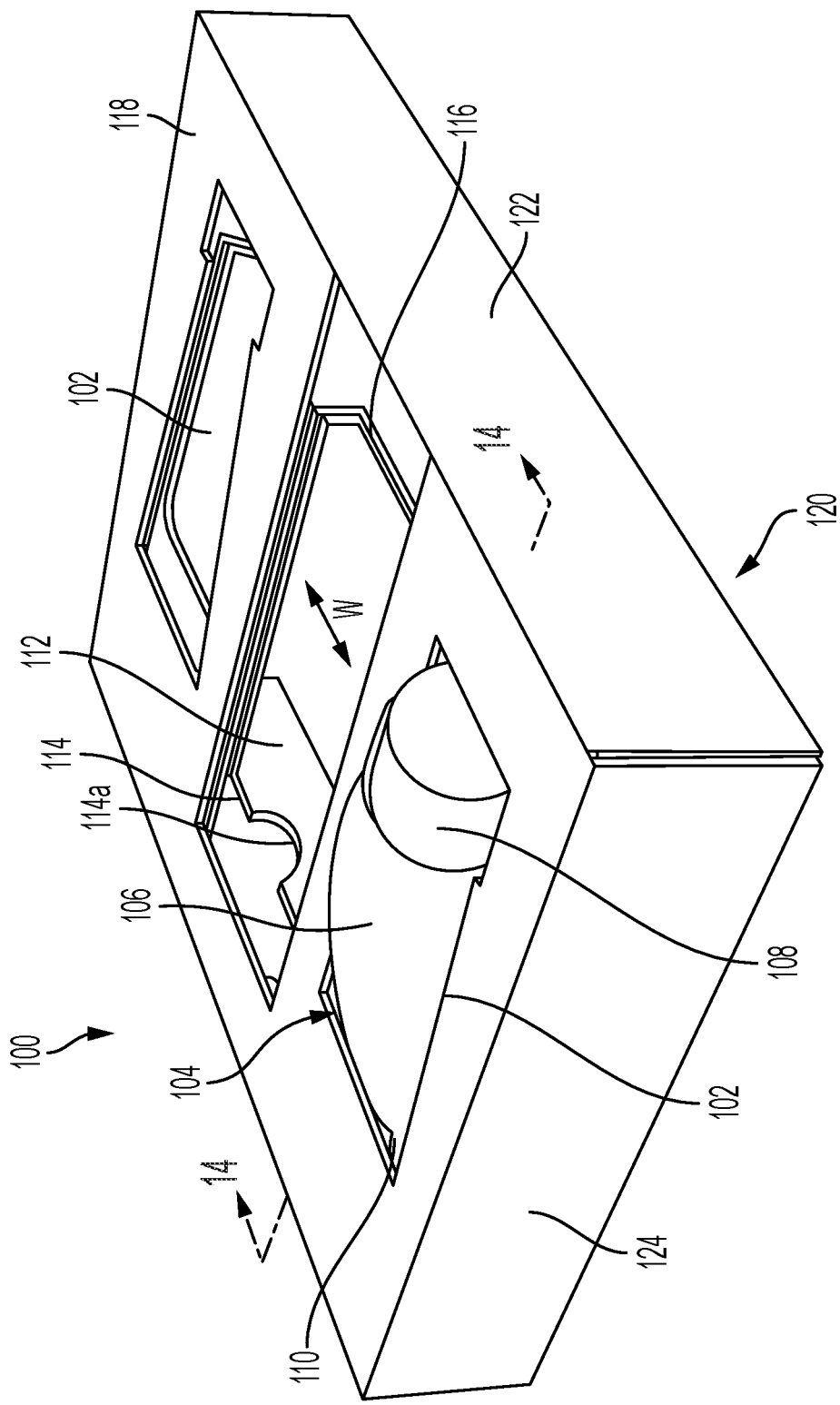
FIG. 6 illustrates an overview perspective of a second embodiment of packaging insert.

Referring now to FIG. 6, there is illustrated a packaging tray, alternatively referred to as a packaging insert, generally referred to by reference number 100. The packaging tray 100 is formed from solid paper board or corrugated paper board and is configured to secure consumer goods in apertures formed therein. The packaging tray 100 is typically used within outer packaging, such as box top and bottom 20, as shown in FIG. 2.

Figure 11:
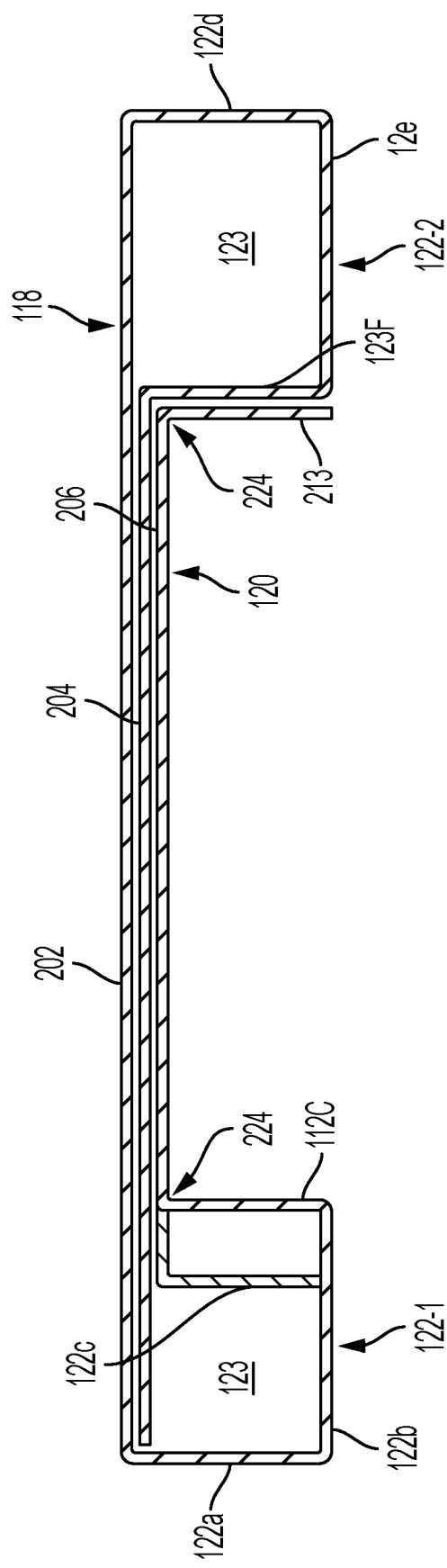
FIG. 11 illustrates a sectional view of the packaging insert of FIG. 10 as taken along line 11-11 in FIG. 10.
Figure 12:
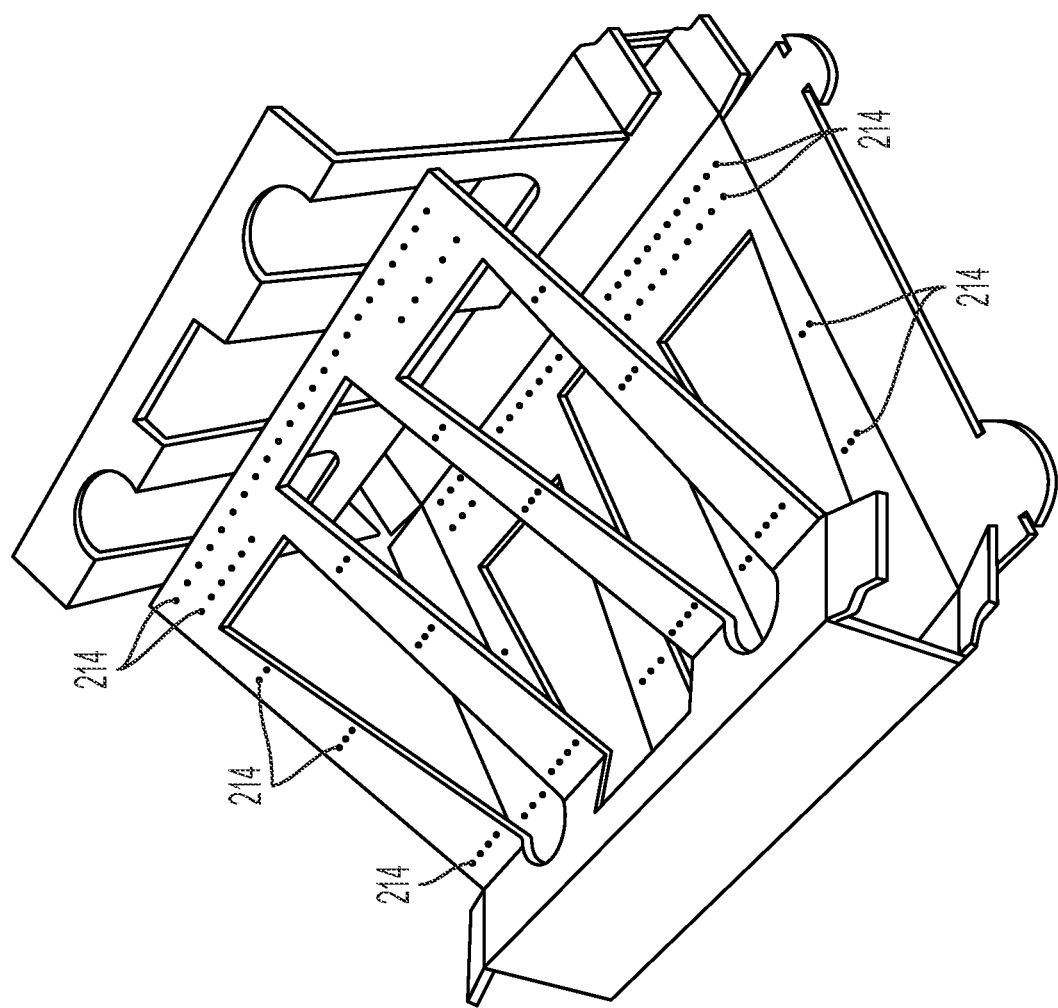
FIG. 12 illustrates exemplary adhesive application areas for the flat pattern of FIG. 9.
Figure 13:
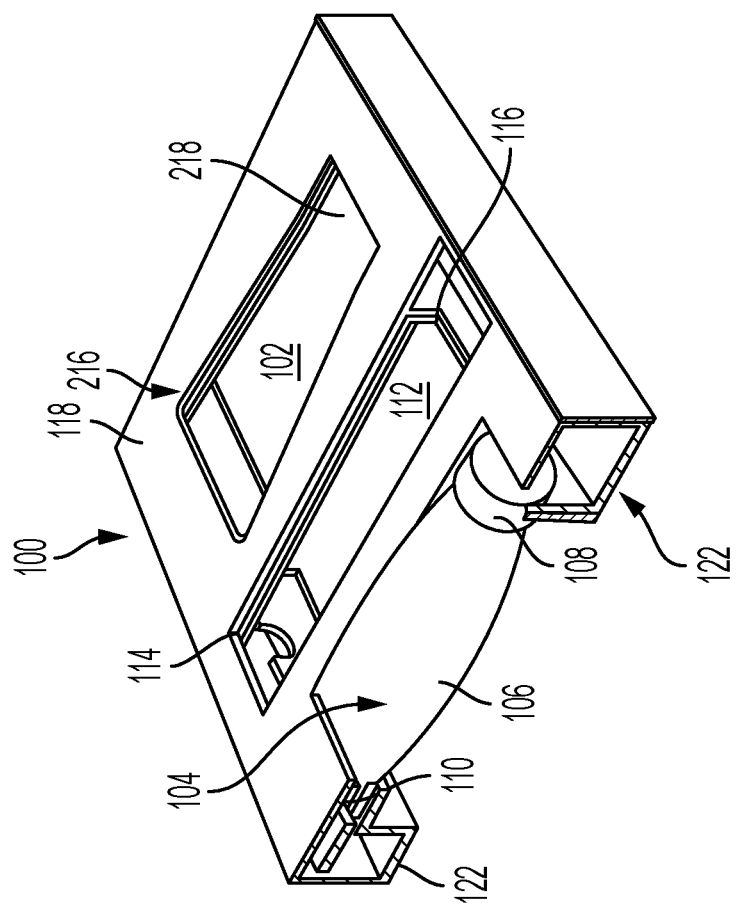
FIG. 13 illustrates the packaging tray of FIG. 1 with a portion cut away at a tube holding aperture along line 14-14 in FIG. 6.

Packaging tray 100 includes a pair of first apertures 102 configured to securely accommodate a tube-type consumer product 104 having a tube body 106 with a cap 108 for sealing the contents in the tube on one end and a crimped tube portion 110 on another end (shown in more detail with regard to FIGS. 11-13). Such tube-type consumer products 104 are well known in the art as having product contained with a flexible tube body 106 such that the product is dispensed from an opening in a neck formed in the tube body 106 when the tube body 106 is compressed. The product is sealed in the tube body when the cap 108 is disposed to cover the opening. The cap 108 typically has female screw threads that mate with corresponding male threads on the neck of the tube body having the opening. The first apertures 102 are configured to securely hold the tube-type consumer product 104 when subjected to forces that may occur during shipping and handling, such as dropping the outer packaging, within which the packaging tray 100 is inserted, from some predetermined height that may be experienced during shipping and handling. Although such apertures 102 can be provided for different size and differently configured tube-type consumer products, for the purposes of this disclosure, they are assumed to have the same structure in packaging tray 100 for accommodating the same tube-type consumer product 104.

Packaging tray 100 further includes a second aperture 112 configured to securely accommodate a rigid container-type consumer product (not shown) to securely hold the rigid container-type consumer product when subjected to forces that may occur during shipping and handling (as discussed above). Although the second aperture 112 can be configured to accommodate various types and sizes of rigid container, by way of example, aperture 112 is configured to accommodate a rigid container having a rectangular shaped body (for holding product) with a circular shaped neck having a male thread and an opening for dispensing the product and a rectangular shaped cap having a corresponding female thread for sealing the opening. Therefore, aperture 112 includes a first support cradle 114 having a circular portion 114a for supporting the circular shaped neck and a second support cradle 116 having a rectangular shape for supporting the rectangular shaped body of the rigid container-type consumer product. The aperture opening 112 has a width in the W direction that is slightly less than a width of the rigid container-type consumer product so as to provide an interference fit of the rigid container-type consumer product within the aperture 112. If the rigid container-type consumer product has a circular body, the same can be retained in the aperture similarly to that shown and described with regard to FIG. 5 above.

The packing tray 100 further has a top surface 118 on which the first and second apertures 102, 112 are formed and through which the consumer products are inserted and a bottom surface 120 (not shown in FIG. 1). The packaging tray 100 further has first and second structural tube ends 122 and first and second closing ends 124.

Figure 7:
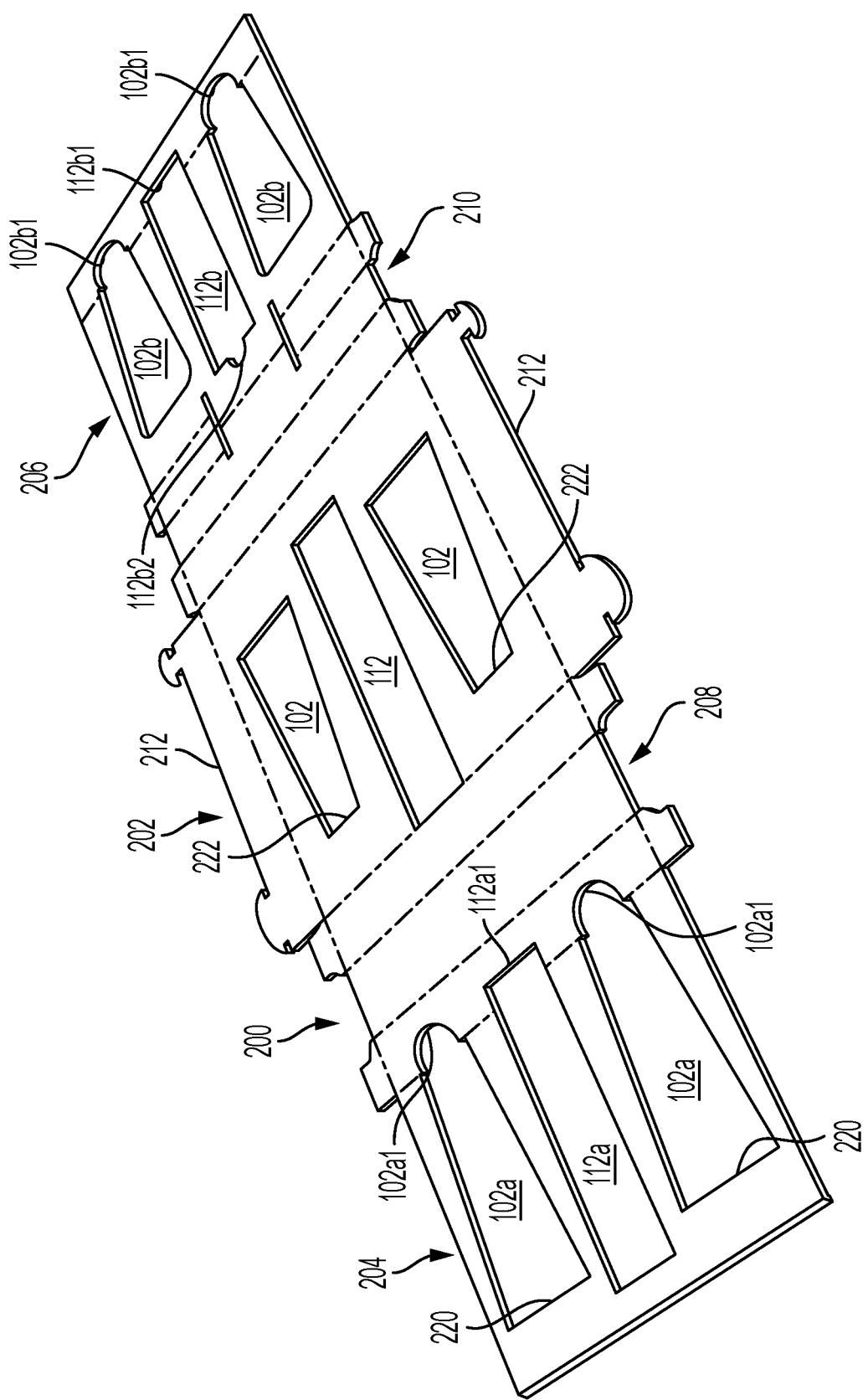
FIG. 7 illustrates a flat pattern of the packaging insert of FIG. 6.

Referring now to FIG. 7 there is shown a flat pattern for the packaging tray 100, the flat pattern being referred to generally by reference number 200 with bending lines being shown as dashed lines. The flat pattern has first, second and third main sections 202, 204 and 206, respectively. A first flat tube portion 208 is disposed between the first and second main sections 202, 204 and a second flat tube portion 210 is disposed between the first and third main sections 202, 206. First and second tray closing ends 212 are disposed on opposing sides of the first main section 202. The first main section 202 has the first and second apertures 102 and 112 that are formed on the top surface 118 of the package tray 100. Apertures 102a, 102b, 112a and 112b formed on the second and third main sections 204, 206, when folded as discussed below correspond to the first and second apertures 102, 112 and further form the first and second cradles 114, 116 and the tube crimp support 216, as discussed below with regard to FIGS. 13-15.

Figure 8:
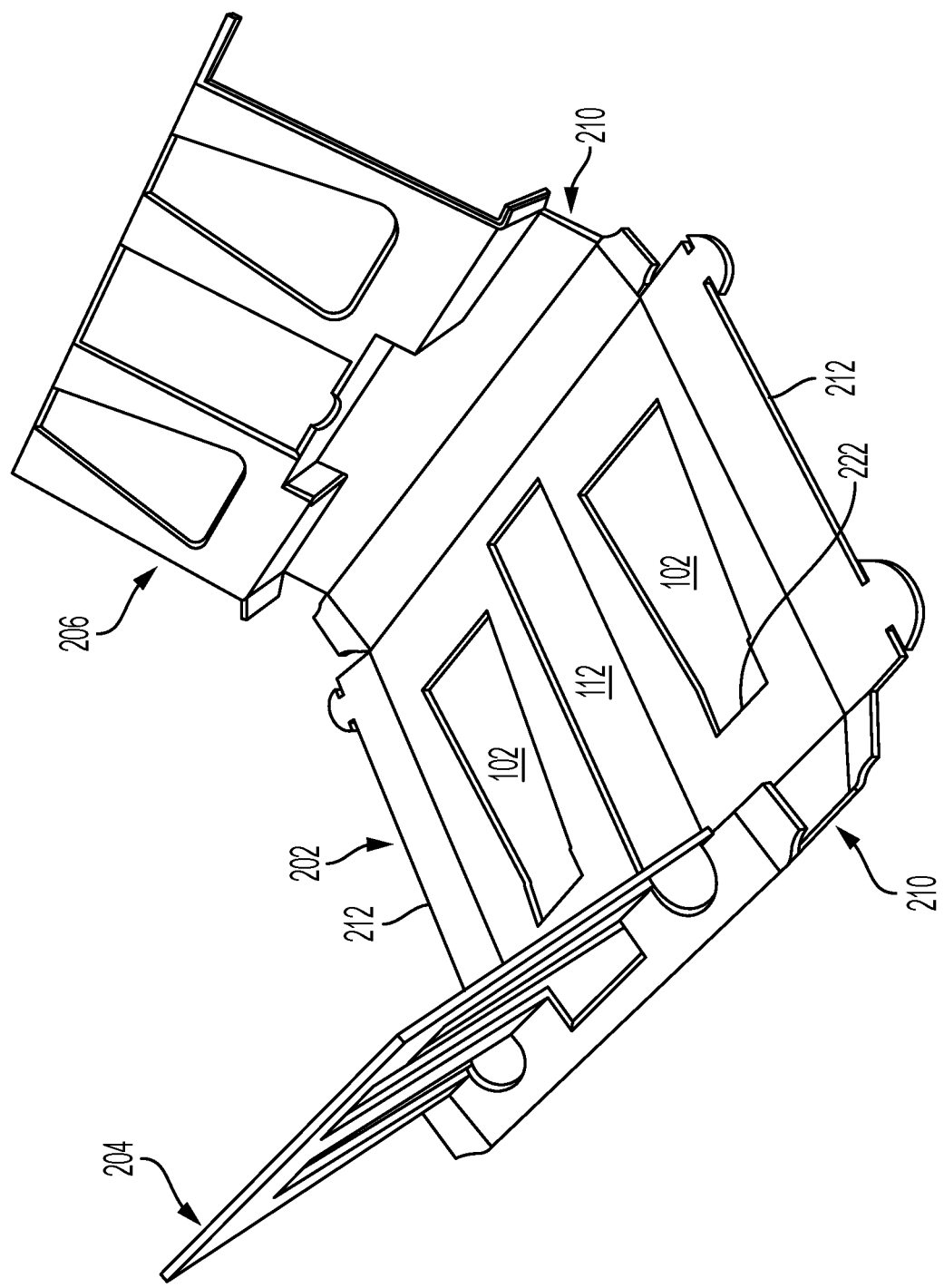
FIGS. 8 and 9 illustrate various stages of bending the flat pattern of FIG. 7.
Figure 9:
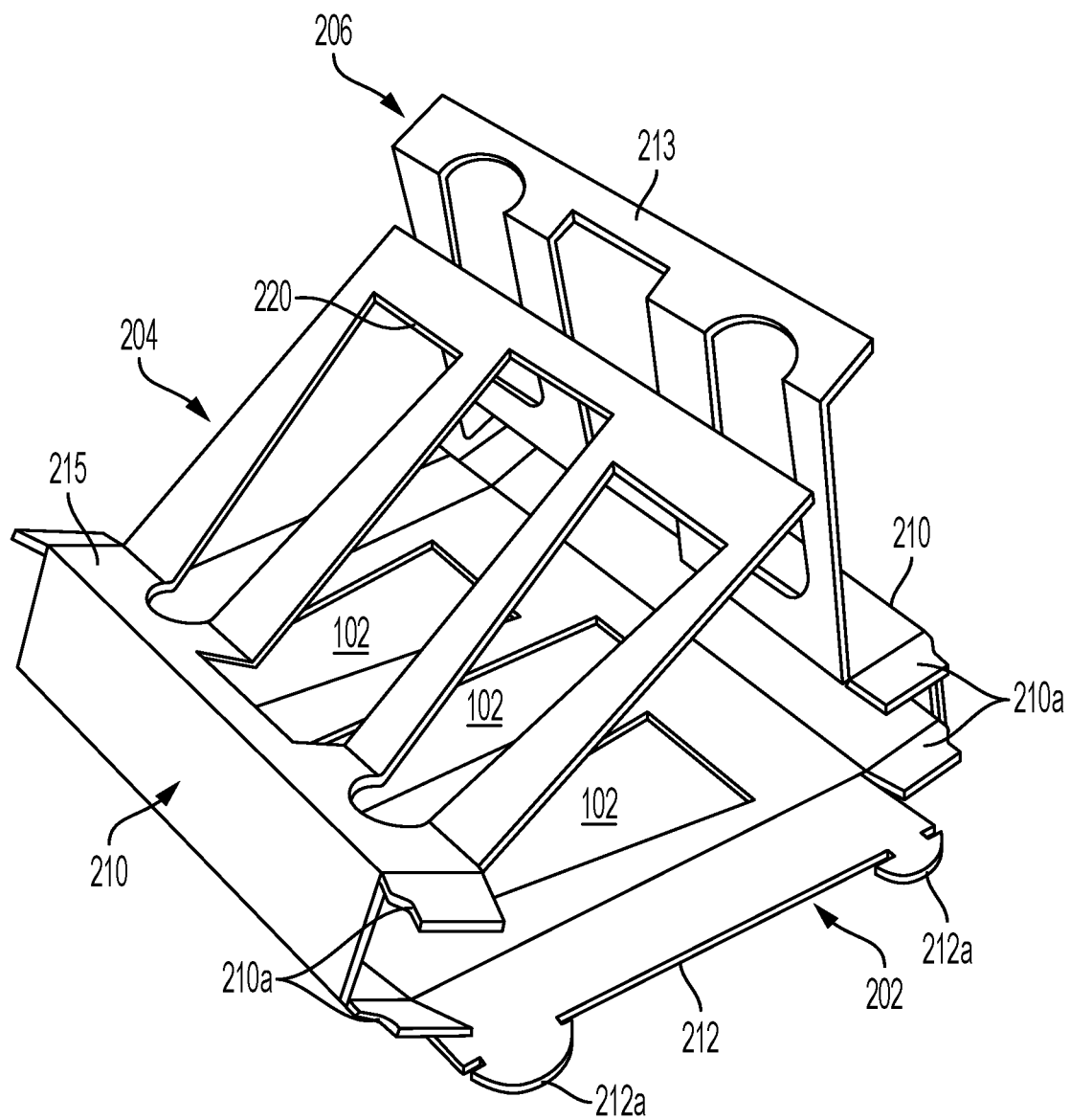
Figure 10:
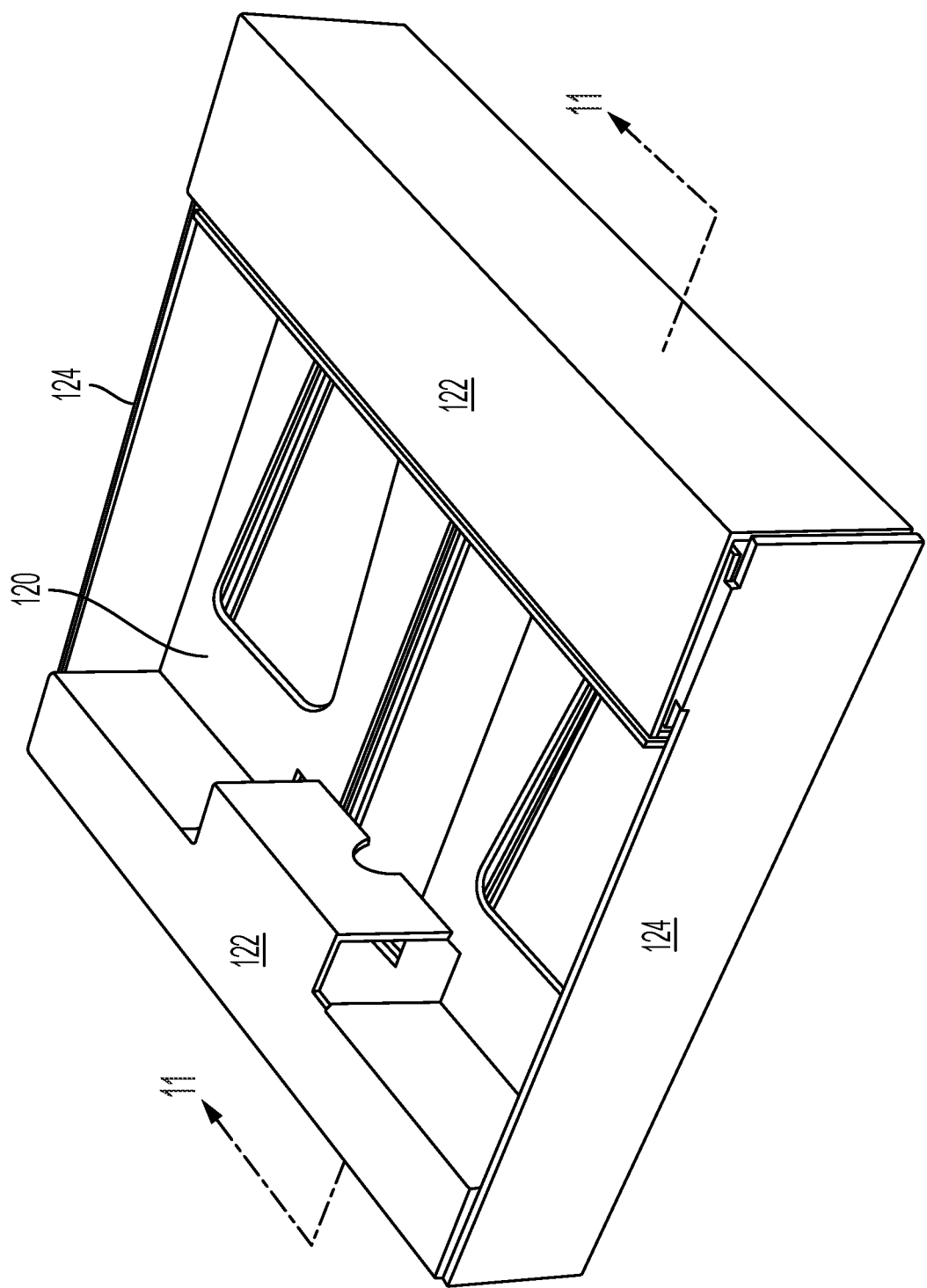
FIG. 10 illustrates the packaging insert of FIG. 6 in a fully bent state from a bottom surface view.

The flat pattern 200 is folded along the folding lines shown in FIG. 7. Referring to FIGS. 8 and 9, the flat pattern of FIG. 7 is shown in various stages of folding and shown fully folded in FIG. 10. When folded, the first, second and third main sections 202, 204, 206 provide for a laminated bridge 224, as shown in FIG. 11, between the first and second structural tube ends 122 which are formed from the first and second flat tube portions 208, 210. The laminated bridge having three layers for an entire length of the laminated bridge extending between the first and second structural tube ends 122. A return portion 213 on the third main section 206 is provided to cover an inside portion 215 of an opposing one of the first and second structural tube ends 122 as shown in FIGS. 9 and 11. The first and second tray closing ends 212 are folded by inserting tabs 212a into corresponding first and second structural tube ends 122 after tube end tabs 210a are folded to cover an opening 123 formed in the first and second structural tube ends 122 (similar inserting tabs and tube end tabs are provided on the other side of the packaging tray 100).

Also, when folded, a first end 112a1 of aperture 112a and a first end 112b1 of aperture 112b form the second support cradle 116. Similarly, a second end 112b2 of the aperture 112b, when folded forms the first support cradle 114. With regard to apertures 102, a first end 102a1 of aperture 102a and a first end 102b1 of aperture 102b, when folded, form cradle 218 (discussed below) for supporting the cap 108 of the tube-type consumer product 104.

Referring to FIG. 11, the first and second structural tube ends (generally referred to above by reference numeral 122) are disclosed in more detail and are more specifically referred to as a first structural tube end 122-1 and a second structural tube end 122-2. The first structural tube end 122-1 comprises a first side 122a folded away from the top surface 118, a second side 122b folded from the first side 122a to extend parallel to the top surface 118 and a third side 122c folded towards the top surface 118. The third main portion 206 being folded from the third side 122c parallel to the first main portion 202 to form part of the laminated structure of the bridge 224.

The second structural tube end 122-2 comprises a fourth side 122d folded away from the top surface 118 (folded from the first main portion 202), a fifth side 122e folded from the fourth side 122d to extend parallel to the top surface 118 and a sixth side 122f folded towards the top surface 118, the second main portion 204 being folded from the sixth side 122f parallel to the first and second main portions 202, 204 to form another layer of the laminated structure of the bridge 224. The first, second and third main portions 202, 204, 206 extend an entire length of the bridge 224 between the first and second structural tube ends 122-1, 122-2 to form a three layer lamination.

Referring now to FIG. 12, the same shows the flat pattern of FIG. 9 having the same state of folding as FIG. 9 with locations of adhesive 214 applied to various surfaces of the flat pattern prior to folding. The locations for the adhesive 214 shown in FIG. 12 are provided by way of example only and can be applied to more or less of the surface of the flat pattern depending on many factors, including the type of material of the flat pattern, the type of adhesive, the size of the packaging tray, the containers being secured in the packaging tray and the specifications for securing such containers under a given load that the packaging tray may be subjected to during shipping and handling.

Figure 15:
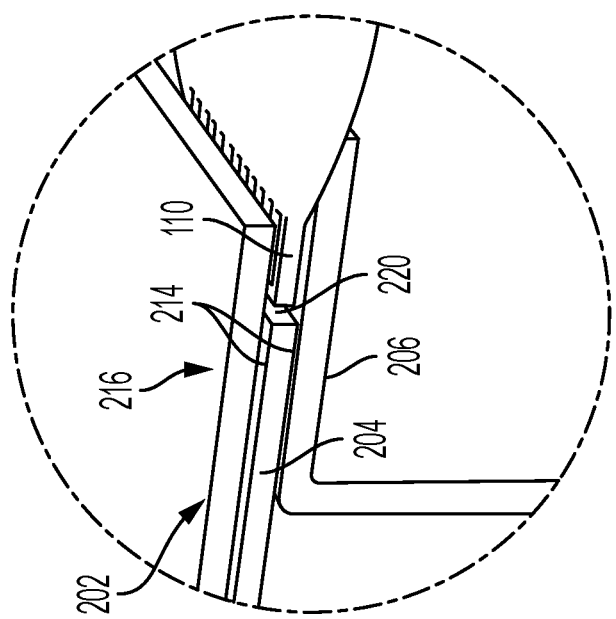
FIG. 15 illustrates a close-up view of a tube crimp support of the tube holding aperture of FIG. 13.
Figure 14:
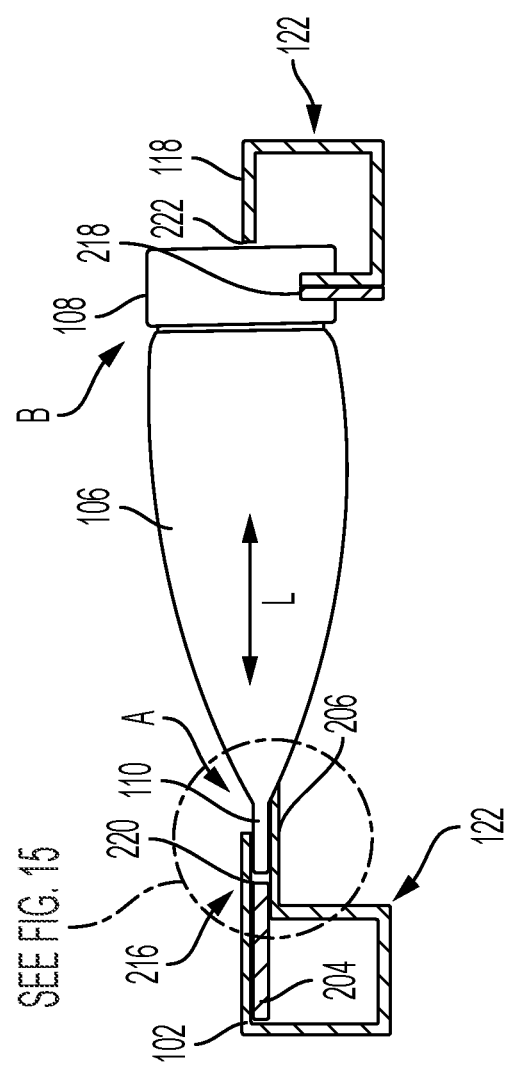
FIG. 14 illustrates a side view of the cut away tube holding aperture of FIG. 13.

Referring now to FIGS. 13-15, a support for the tube-type consumer product 104 is shown, where such support has a tube crimp support 216 and a tube cradle 218 for supporting the tube body 106 or cap 108. Although FIGS. 13-15 show the tube cradle 218 as supporting the cap 108 by way of example, the tube cradle 218 can instead support the tube body 106. With regard to the tube cap 108, the same can be securely held in the aperture 102 similarly to that shown and discussed above with regard to FIG. 5.

The tube crimp support 216 is configured to securely sandwich the crimped tube portion 110 between the portion of the package tray 100 that is formed by the portion first main section 202 and the portion of the package tray 100 that is formed by the portion third main section 202. The tube crimp support 216 also includes a first stop 220 (see also FIG. 9) formed by an end of the aperture 102a of the second main section 204 and a second stop 222 (see also FIG. 8) formed by an end of aperture 102 formed in the first main section 202 to prevent movement of the tube-type consumer product 104 in the direction of arrow L. As shown in FIGS. 12 and 15, adhesive 214 can be provided to adhere the components of the tube crimp support 216 to prevent delamination of the first, second and third main sections 202, 204, 206.

As shown in FIGS. 13 and 14, the tube-type consumer product 104 is secured in the first aperture 102 with the cap 108 supported by the tube cradle 218 and the crimped tube portion 110 being sandwiched between portions of the first and third main sections 202, 206. To support the tube-type consumer product 104 in the direction of arrow L, the end 220 of aperture 102a in the second main section 204 is sandwiched between the first and third main sections 202, 206 and acts as a first stop to prevent movement in the L direction. On the other end of the tube-type consumer product 104, the second stop 222 is formed by an end of aperture 102 formed in the first main section 202. The first and second stops 220, 222 limit the movement of the tube-type consumer product 104 in the L direction.

As shown clearly in FIGS. 14 and 15, the length of the apertures 102, 102a and 102b in the first, second and third main sections 202, 204, 206, respectively vary to provide the sandwich of the crimped tube portion 110 and to provide the first stop 220. In the configuration shown in FIGS. 14 and 15, the length of the aperture 102a in the L direction is shown to be longer than the length of the apertures 102, 102b so as to form the stop 220. The length of the aperture 102 corresponding to the first main section 202 is shown to be longer than the aperture 102b corresponding to the third main section 206 to facilitate insertion of the crimped tube portion 110 into the tube crimp support 216 from the top surface 118 along arrow A. After the tube crimped portion 110 is inserted into the tube crimp support 216 along arrow A, the cap 108 is rotated along arrow B to secure the tube-type consumer product 104 in the aperture 102. Although the lengths of the apertures 102 and 102b are shown to be different for purposes of facilitating insertion of the crimped tube portion 110 into the tube crimp support 216, they can also have similar lengths in the L direction.

Although the packaging tray 100 is not shown with returns 14 (see FIG. 1), the packaging tray 100 can be alternatively provided with such returns on at least a portion of the first and second closing ends 124 to extend above the top surface 118. Such returns 14 are useful for securing the packaging tray 100 in the box 10 to prevent movement of the tray in the depth direction of the box. That is, the overall height of the packaging tray 100 including the returns 14 can be substantially equal to a depth of the interior of the box.

Figure 16:
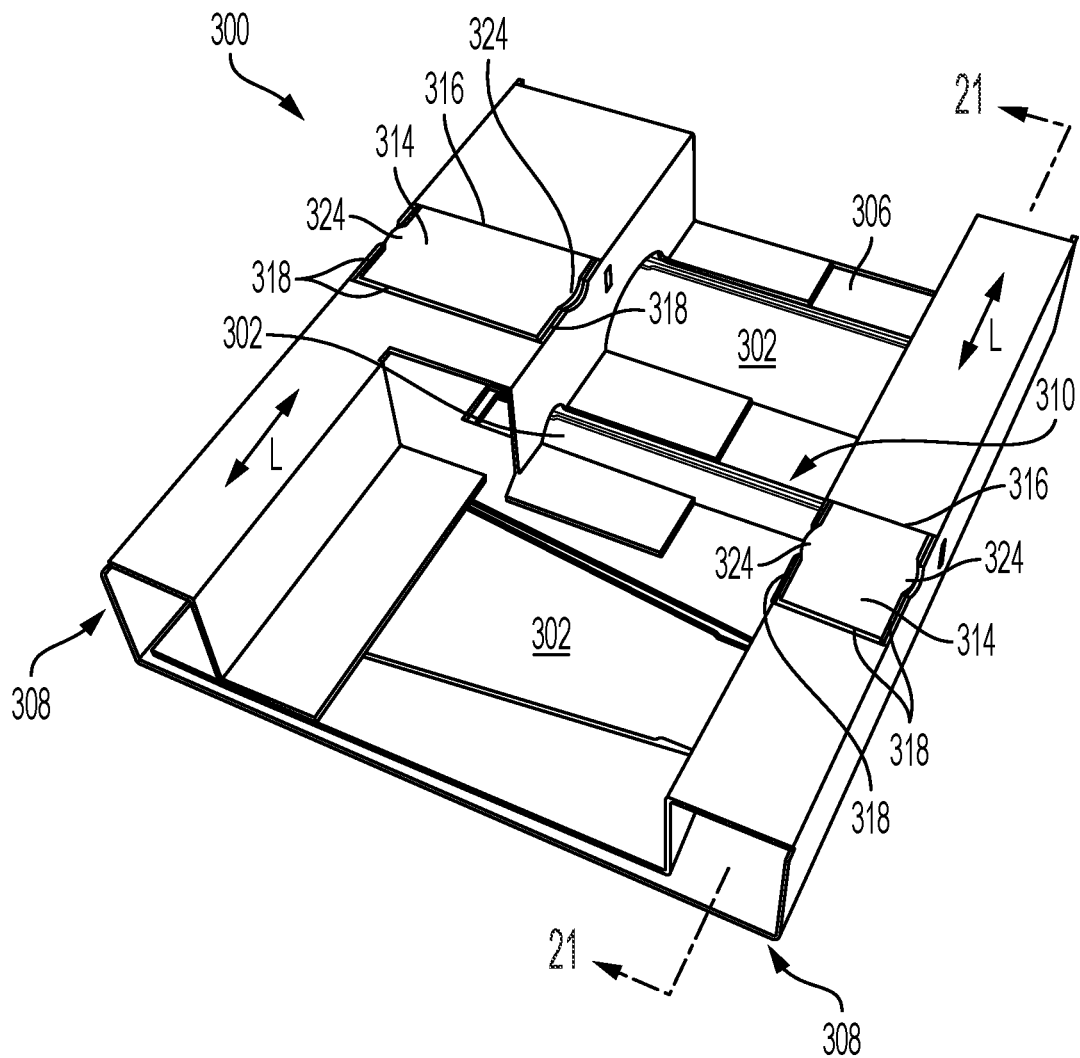
FIG. 16 illustrates an overview bottom perspective of an embodiment of packaging insert prior to tucking stability panels.
Figure 17:
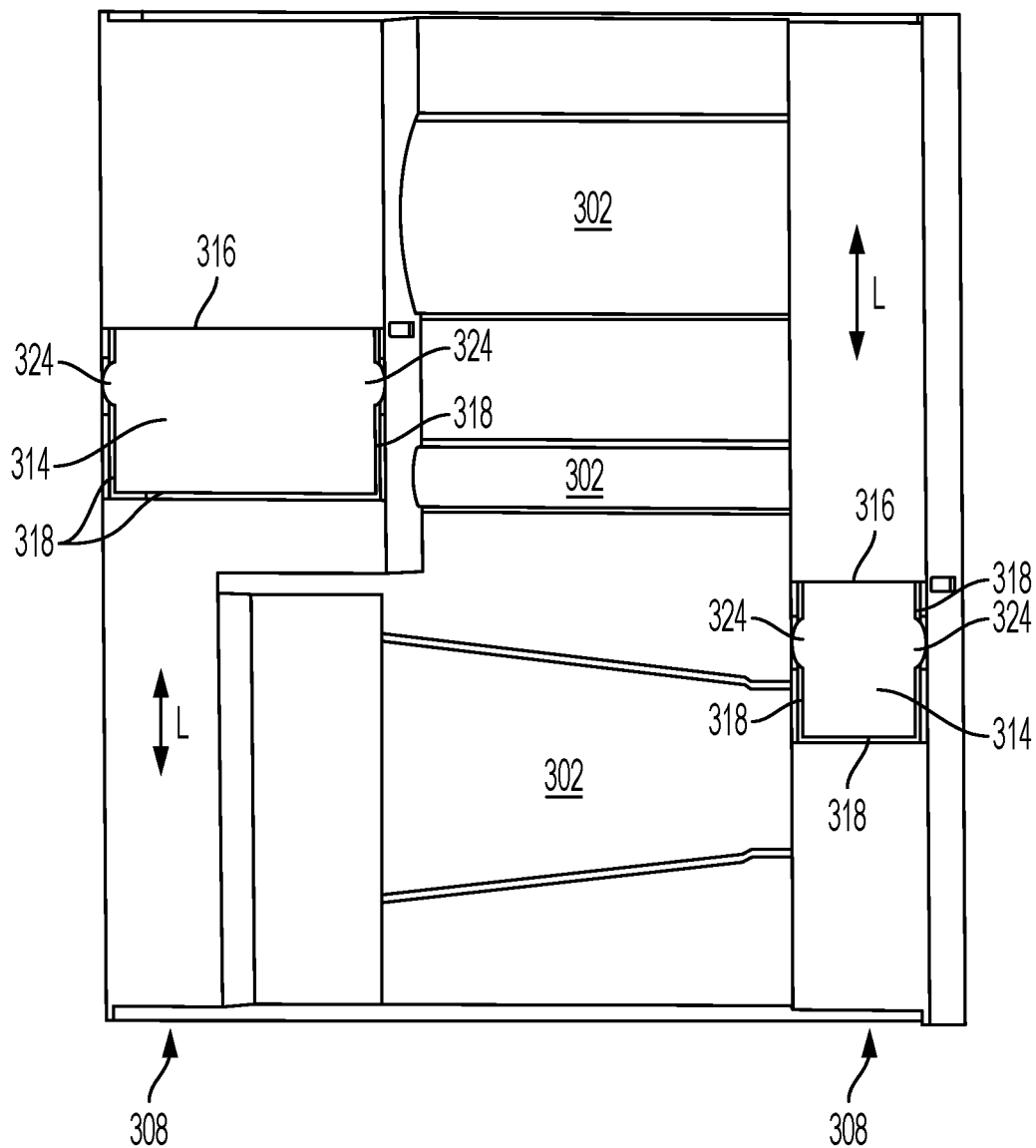
FIG. 17 illustrates an bottom view of the embodiment of FIG. 16 prior to tucking stability panels.

Referring now to FIGS. 16 and 17, there is shown another embodiment of packaging insert (or tray), generally referred to by reference numeral 300. However, packaging insert 300 does not include closing ends 212, inserting tabs 212a and tube end tabs 210 described with regard to the packing insert of FIG. 6. The closing ends 212, inserting tabs 212a and tube end tabs 210 are provided in the packing insert of FIG. 6 to provide stability for the first and second structural tube ends 122-1, 122-2 by preventing such first and second structural tube ends 122-1, 122-2 from collapsing or otherwise losing their rectangular shape. The packaging insert of FIGS. 16 and 17 provides an alternative configuration for preventing such first and second structural tube ends 308 from collapsing or otherwise losing their rectangular shape.

Similarly to the embodiment of FIG. 6, the packaging insert, 300 of FIG. 16 is formed from solid paper board or corrugated paper board and is configured to secure consumer goods in apertures formed therein. The packaging tray 300 is typically used within outer packaging, such as box top and bottom 20, as shown in FIG. 2.

Packaging tray 300 includes apertures 302 configured to securely accommodate the type of consumer products discussed above. The first apertures 302 are configured to securely hold the consumer products when subjected to forces that may occur during shipping and handling, such as dropping the outer packaging, within which the packaging tray 300 is inserted, from some predetermined height that may be experienced during shipping and handling. Such apertures 302 can be configured similarly to those above for securing tube-type consumer product container and/or rigid-type containers having cylindrical or other shaped exteriors.

The packing tray 300 further has a top surface 304 (see FIGS. 21 and 22) on which the apertures 302 are formed and through which the consumer products are inserted and a bottom surface 306. The packaging tray 300 further has first and second structural tubes 308, which are open to an outside of the packaging tray 300 on each of two ends.

Figure 19:
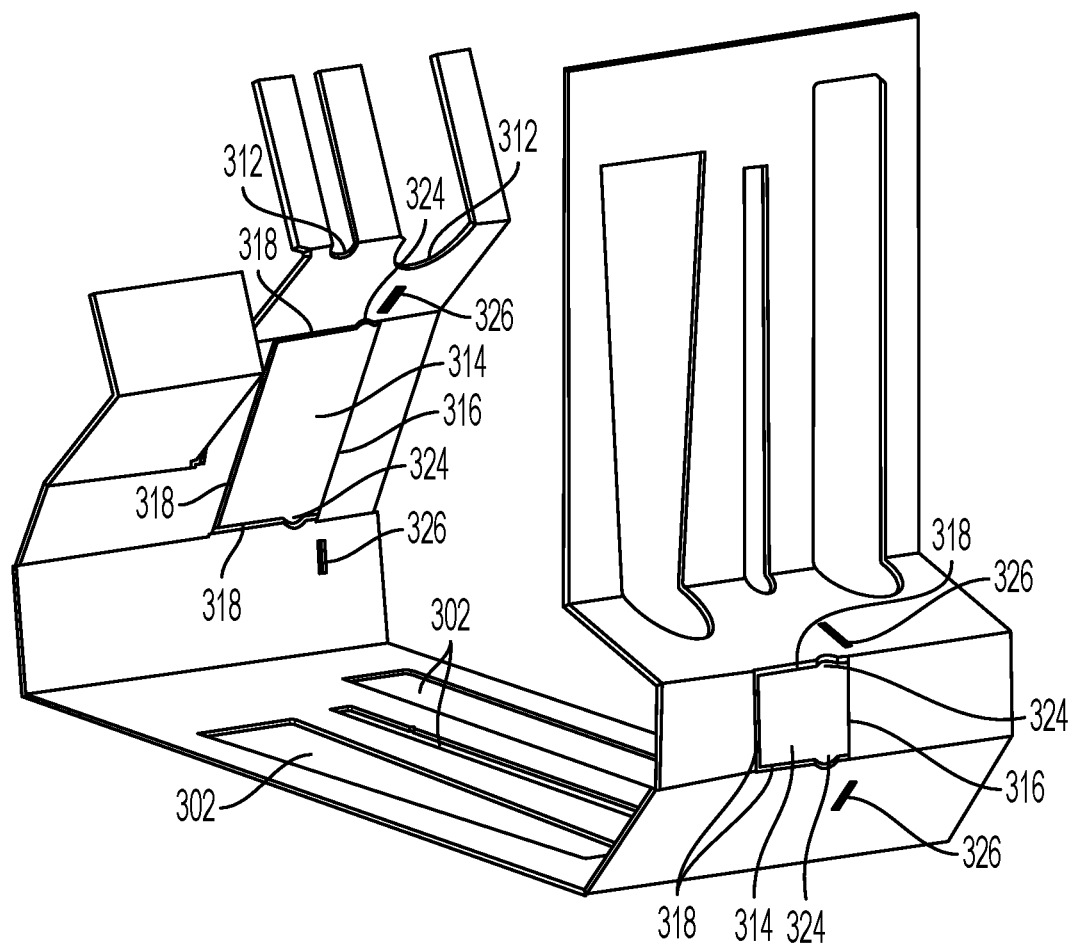
FIGS. 19 and 20 illustrate various stages of bending the packaging insert of FIG. 16.
Figure 20:
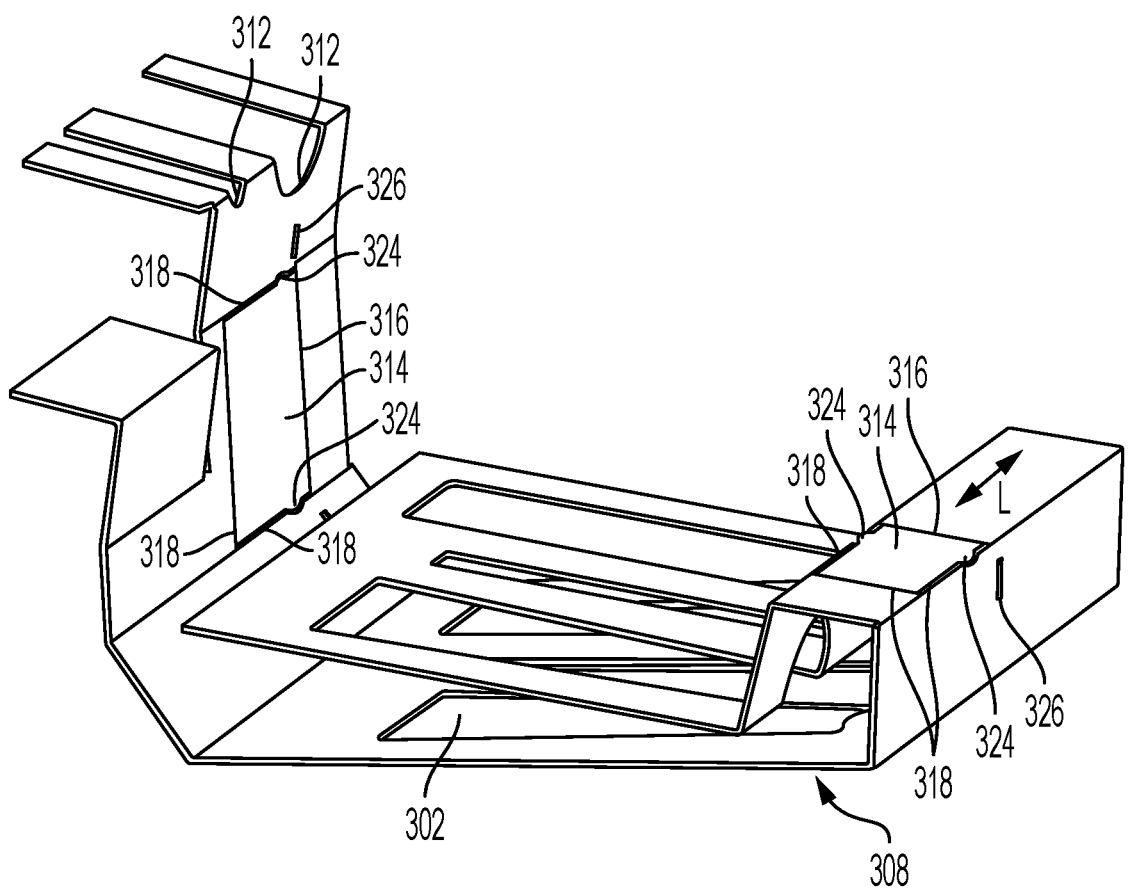

Referring now to FIGS. 19 and 20 there is shown a flat pattern for the packaging tray 300, shown in various stages of folding. Similarly as discussed above, the packaging try 300 can be provided with a laminated bridge 310, as shown in FIG. 16, between the first and second structural tube ends 308. Also, when folded, the apertures can have one or more support cradles 312, as discussed above and shown in FIGS. 21 and 22 or the aperture can have the tube crimp support described above and shown in FIGS. 13-15.

As an alternative to the closing ends 212, inserting tabs 212a and tube end tabs 210 provided in the packing insert of FIG. 6, the packaging tray 300 can include stability panels 314 to provide stability for the first and second structural tubes 308 by preventing such first and second structural tube 308 from collapsing or otherwise losing their rectangular shape.

Figure 18:
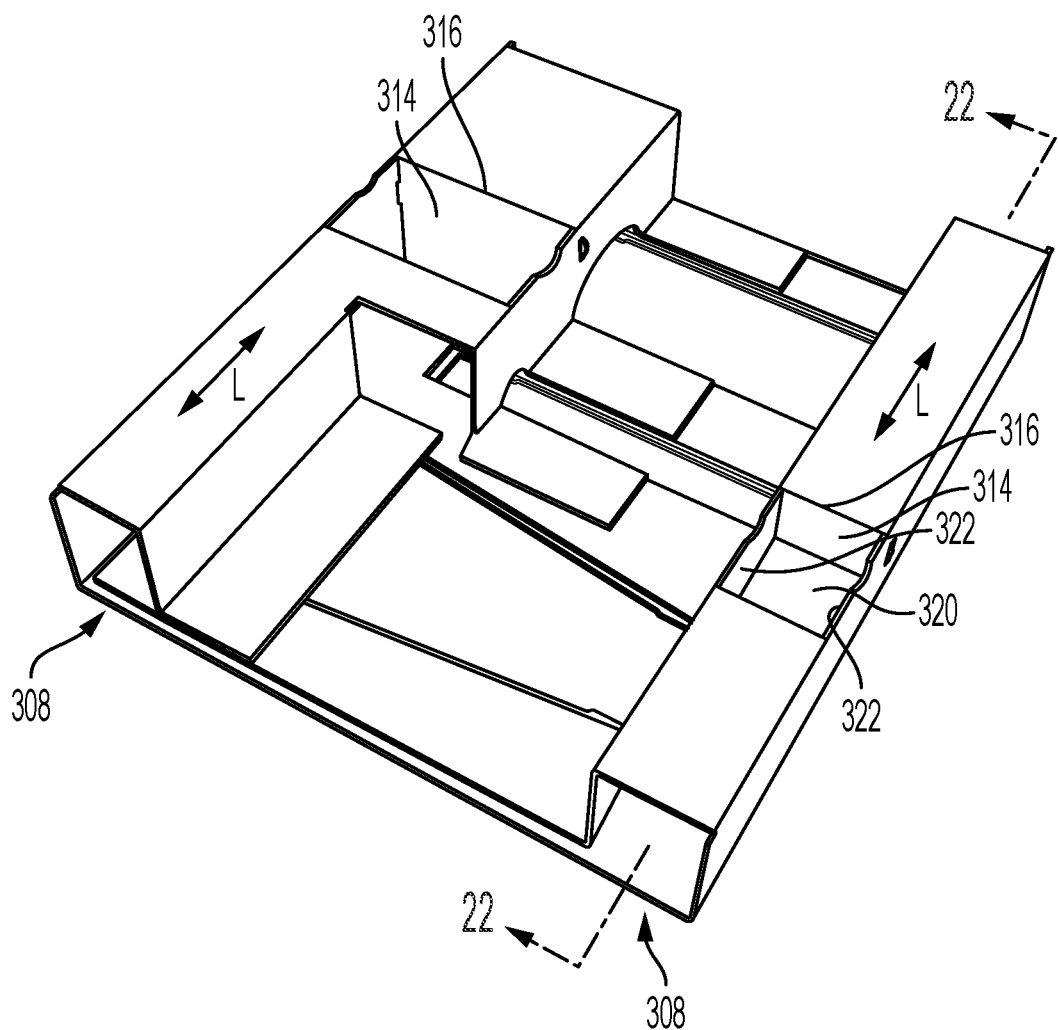
FIG. 18 illustrates an overview bottom perspective of the embodiment of FIG. 16 with tucked stability panels.
Figure 21:
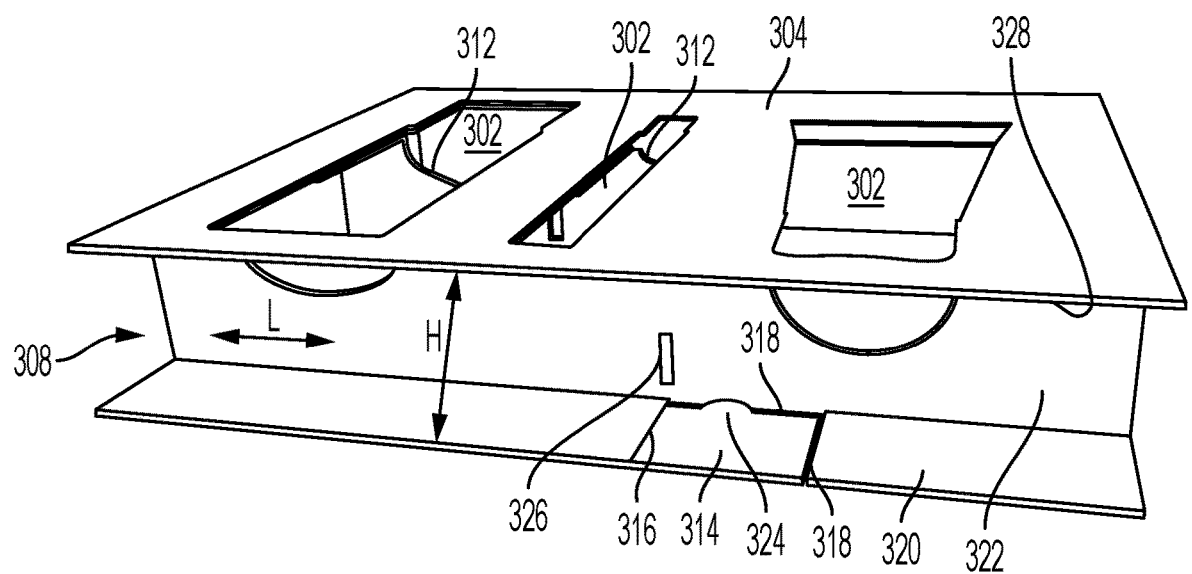
FIG. 21 illustrates a section view as taken along line 21-21 in FIG. 16.
Figure 22:
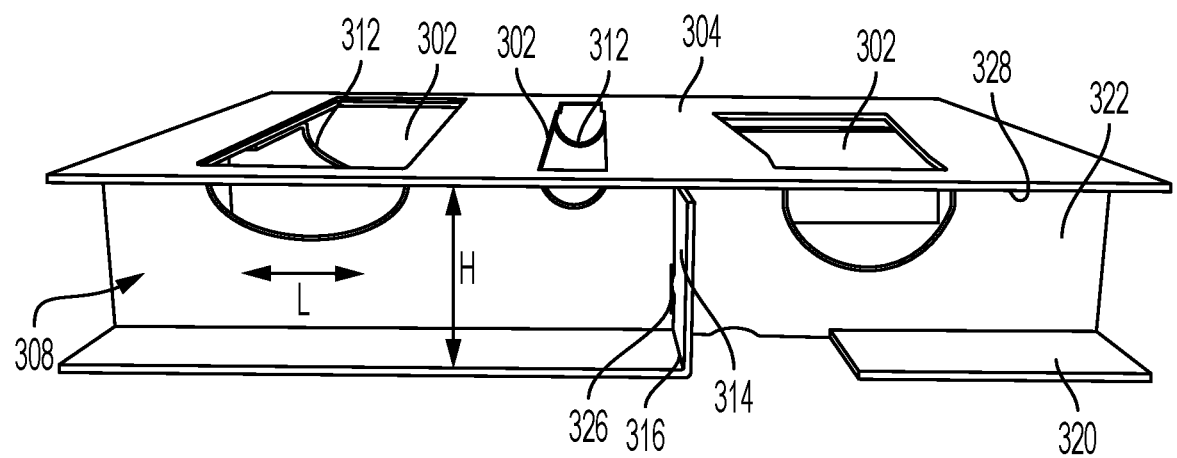
FIG. 22 illustrates a section view as taken along line 22-22 in FIG. 18.

Such stability panels 314 are shown in FIGS. 16, 17 and the section view of FIG. 21 with fold line 316 unfolded. That is, the stability panel is surrounded on three-sides 318 with a through-cut and uncut at a fold line 314 on a fourth side. Although the stability panel is shown as having a rectangular shape, other shapes are possible. As shown in FIGS. 18 and 22, the stability panel 314 is shown folded to occupy the internal cross-sectional shape of the structural tubes 308.

Further, each stability panel 314 can also be configured to lock into place, such as at a position as shown in FIG. 22, which is substantially orthogonal to the extending direction (L) of the structural tubes 308, or at some other angle, offset from the extending direction (L).

As a first alternative, the stability panel(s) 308 can be configured to have a slight interference fit with the side walls 322 and/or the bottom wall 320 (opposing the fold line 316) of the structural tubes 308. Such interference fit provides a snug fit of the stability panel 314 within the structural tube 308 to maintain the position of the structural panel 314 within the interior of the structural tubes 308 to provide stability for the structural tubes 308 by preventing such structural tubes 308 from collapsing or otherwise losing their rectangular shape.

As another alternative, the stability panel 308 can be provided with a locking protrusion (or tab) 324 on one or both sides 318 and a corresponding locking cut-out 326 formed on a corresponding side wall 322 of the structural tube 308. FIG. 21 shows a sectional view as taken about line 21-21 in FIG. 16 in which the stability panel 314 in the structural tube 308 is unfolded about fold line 316 and locking cut-out 326 is unoccupied by the locking protrusion 324. As shown in the sectional view of FIG. 22, as taken about line 22-22 in FIG. 18, the stability panel 308 of FIG. 21, is shown folded about fold-line 308 and locked into position by the locking protrusion 324 being inserted into the corresponding locking cut out 326 positioned to lock the stability panel 324 into a predetermined locking position (such as being orthogonal to the extending direction (L) of the structural tube 308). The "walls" of the interior of the structural tubes 308 are alternatively referred to as "surfaces."

Although the stability panels 314 are shown as being a single structural panel generally centrally located along the extending length (L) of each structural tube 308 and as having a substantially same height as the interior height (H) of each structural tube 308, more than one stability panel 314 can be provided in one or both structural tubes 308. Further, each panel, whether provided singular or multiple, can be offset from the center along the extending length (L) of each structural tube 308 and can a height less than the interior height (H) of each structural tube 308.

Furthermore, although the fold line 316 is shown as being on the bottom wall 320 of the structural tube 308 and the locking cut-out(s) are shown as being on the side walls 322, the fold-line can be provided on the side walls 422 or the top wall 328 and the cut-out can be provided on bottom wall 320 or top wall 328, in general, the fold line and/or cut-outs are avoided on the top wall 328 to avoid the same appearing on the surface being displayed to a customer.

Thus, while there have been described what are presently believed to be preferred embodiments of the invention, those skilled in the art will realize that changes and modifications may be made thereto without departing from the spirit of the invention, and it is intended to claim all such changes and modifications as fall within the true scope of the invention.

What is claimed is:

1. A packaging tray comprising:
a folded body formed of paper board, the folded body having an exterior top surface having one or more apertures each configured to accommodate and retain a container therein;
the folded body having at least one structural tube;
the structural tube comprises a plurality of interior surfaces forming the structural tube; and
the structural tube comprises a stability panel formed in a folding surface, the folding surface being one of the plurality of interior surfaces forming the structural tube;
wherein the stability panel comprising a plurality of sides, one of the plurality of sides being a fold line and the other of the plurality of sides being cut through the folding surface such that the stability panel is configured to be folded into an interior of the structural tube into a predetermined position to prevent the structural tube from changing a predetermined cross-sectional shape.

2. The packaging tray according to claim 1, wherein the paper board has a thickness of more than 0.012 inches.

3. The packaging tray according to claim 1, wherein the paper board has a grammage of more than 250 g/m².

4. The packaging tray according to claim 1, wherein the plurality of interior surfaces forming the structural tube comprising an interior top surface, an interior bottom surface and first and second opposing interior side surfaces connecting the top surface and the bottom surface.

5. The packaging tray according to claim 4, wherein the folded surface is the bottom surface.

6. The packaging tray according to claim 1, wherein
the at least one structural tube comprises first and second structural tubes disposed at respective first and second opposing ends of the folded body; and
the stability panel is provided at each of the first and second structural tubes.

7. The packaging tray according to claim 1, wherein a length of the stability panel from the fold line to an opposing side of the plurality of sides is greater than a corresponding interior height of the structural tube.

8. The packaging tray according to claim 1, wherein a width of the stability panel between opposing sides of the plurality of sides adjacent to the fold line is greater than a corresponding interior width of the structural tube.

9. The packaging tray according to claim 1, wherein
the stability panel having a protrusion protruding from one or more sides of the plurality of sides other than the side having the fold line; and
the structural tube having a cut-out on one of the interior sides corresponding to the protrusion such that the protrusion aligns with the cut-out at the predetermined position.

10. The packaging tray according to claim 9, wherein
the protrusion comprising a first protrusion and a second protrusion each protruding from a side of the plurality of sides other than the side having the fold line; and
the cut-out comprises a first cut-out and a second cut-out on the interior side corresponding to the respective first protrusion and second protrusion such that the first protrusion and the second protrusion align with the respective first cut-out and second cut-out at the predetermined position.

11. The packaging tray according to claim 1, wherein the stability panel, when folded at the predetermined position is provided centrally relative to an extended length of the structural tube.

12. A packaging tray comprising:
one or more containers;
a folded body formed of paper board, the folded body having an exterior top surface having one or more apertures each configured to accommodate and retain a container therein;
the folded body having at least one structural tube;
the structural tube comprises a plurality of interior surfaces forming the structural tube; and
the structural tube comprises a stability panel formed in a folding surface, the folding surface being one of the plurality of interior surfaces forming the structural tube;
wherein the stability panel comprising a plurality of sides, one of the plurality of sides being a fold line and the other of the plurality of sides being cut through the folding surface such that the stability panel is configured to be folded into an interior of the structural tube into a predetermined position to prevent the structural tube from changing a predetermined cross-sectional shape.

13. The packaging tray according to claim 12, wherein the paper board has a thickness of more than 0.012 inches.

14. The packaging tray according to claim 12, wherein the paper board has a grammage of more than 250 g/m².

15. The packaging tray according to claim 12, wherein the plurality of interior surfaces forming the structural tube comprising an interior top surface, an interior bottom surface and first and second opposing interior side surfaces connecting the top surface and the bottom surface.

16. The packaging tray according to claim 15, wherein the folded surface is the bottom surface.

17. The packaging tray according to claim 12, wherein
the at least one structural tube comprises first and second structural tubes disposed at respective first and second opposing ends of the folded body; and
the stability panel is provided at each of the first and second structural tubes.

18. The packaging tray according to claim 12, wherein a length of the stability panel from the fold line to an opposing side of the plurality of sides is greater than a corresponding interior height of the structural tube.

19. The packaging tray according to claim 12, wherein a width of the stability panel between opposing sides of the plurality of sides adjacent to the fold line is greater than a corresponding interior width of the structural tube.

20. The packaging tray according to claim 12, wherein
the stability panel having a protrusion protruding from one or more sides of the plurality of sides other than the side having the fold line; and
the structural tube having a cut-out on one of the interior sides corresponding to the protrusion such that the protrusion aligns with the cut-out at the predetermined position.

21. The packaging tray according to claim 20, wherein
the protrusion comprising a first protrusion and a second protrusion each protruding from a side of the plurality of sides other than the side having the fold line; and
the cut-out comprises a first cut-out and a second cut-out on the interior side corresponding to the respective first protrusion and second protrusion such that the first protrusion and the second protrusion align with the respective first cut-out and second cut-out at the predetermined position.

22. The packaging tray according to claim 12, wherein the stability panel, when folded at the predetermined position is provided centrally relative to an extended length of the structural tube.

* * * * *